(12) United States Patent
Sever

(10) Patent No.: US 10,230,287 B2
(45) Date of Patent: Mar. 12, 2019

(54) ELECTRIC MACHINE HEAT SINK WITH INCORPORATED PIN FIN ARRANGEMENT

(71) Applicant: Mahle International GmbH, Stuttgart (DE)

(72) Inventor: Peter Sever, Sobota (SI)

(73) Assignee: Mahle International GmbH (DE)

(*) Notice: Subject to any disclaimer, the term of this patent is extended or adjusted under 35 U.S.C. 154(b) by 263 days.

(21) Appl. No.: 15/113,841

(22) PCT Filed: Jan. 26, 2015

(86) PCT No.: PCT/IB2015/050588
§ 371 (c)(1),
(2) Date: Jul. 25, 2016

(87) PCT Pub. No.: WO2015/111018
PCT Pub. Date: Jul. 30, 2015

(65) Prior Publication Data
US 2017/0012504 A1    Jan. 12, 2017

(30) Foreign Application Priority Data

Jan. 26, 2014 (SI) .................................. 201400028

(51) Int. Cl.
*H02K 9/00* (2006.01)
*H02K 9/22* (2006.01)
(Continued)

(52) U.S. Cl.
CPC ................. *H02K 9/22* (2013.01); *H02K 5/18* (2013.01); *H02K 5/20* (2013.01); *H02K 9/19* (2013.01);
(Continued)

(58) Field of Classification Search
CPC .. H02K 5/20; H02K 5/18; H02K 9/22; H02K 15/14
(Continued)

(56) References Cited

U.S. PATENT DOCUMENTS 5,331,238 A * 7/1994 Johnsen ................. H02K 1/185
310/216.049
5,630,461 A * 5/1997 CoChimin .............. B22C 9/046
164/34
(Continued)

FOREIGN PATENT DOCUMENTS

DE    102009047215 A1    6/2014
JP        2009 165294 A    7/2009

*Primary Examiner* — Hanh Nguyen
(74) *Attorney, Agent, or Firm* — Fishman Stewart PLLC

(57) ABSTRACT

A heat sink with incorporated pin fin arrangement means is preferably part of a cooling jacket assembly, used for cooling the electric machine assembly. In general, the cooling jacket assembly comprises an annular cooling jacket body (i.e. a heat sink (4)) preferably adapted for receiving a stator (3) of the electric machine. In addition, the heat sink (4) of a cooling jacket comprises at least one substantially cylindrical wall section with at least one group of incorporated unidirectional heat transfer protuberances (i.e. pin fin (42) arrangement in free-form formation), wherein the heat sink (4) in cooperation with the electric machine assembly forms an annular gap (i.e. a cooling channel) preferably adapted for coolant flow circulation. The heat sink (4) according to the invention is preferably casted or molded as one body part in a single operation; hence the cost effective solution of high performance heat sink (2) is achieved.

19 Claims, 9 Drawing Sheets

(51) Int. Cl.
*H02K 5/18* (2006.01)
*H02K 5/20* (2006.01)
*H02K 9/19* (2006.01)
*H02K 15/14* (2006.01)

(52) U.S. Cl.
CPC ......... *H02K 15/14* (2013.01); *H02K 2213/03* (2013.01)

(58) Field of Classification Search
USPC .................................. 310/52, 54, 58, 64
See application file for complete search history.

(56) References Cited

U.S. PATENT DOCUMENTS

| | | | | |
|---|---|---|---|---|
| 6,300,693 B1 * | 10/2001 | Poag | ........................ | H02K 5/20 310/54 |
| 2008/0100159 A1 * | 5/2008 | Dawsey | ................... | H02K 1/20 310/54 |
| 2008/0223557 A1 | 9/2008 | Fulton et al. | | |
| 2008/0231126 A1 * | 9/2008 | Telore | ..................... | H02K 5/20 310/59 |

* cited by examiner

ELECTRIC MACHINE HEAT SINK WITH INCORPORATED PIN FIN ARRANGEMENT

CROSS-REFERENCE TO RELATED APPLICATIONS

This application claims priority to Slovenian Patent Application No. P-201400028, filed on Jan. 26, 2014, and International Patent Application No. PCT/IB2015/050588, filed on Jan. 26, 2015.

TECHNICAL FIELD

This invention relates generally to systems for cooling electric machines and, more particularly, to a cooling jacket assembly for cooling an electric motor and/or generator (hereinafter referred to as electric machine) having high heat-dissipation requirements, and to a method of manufacture the heat sink of the cooling jacket.

BACKGROUND

The technological problem addressed by this patent-application is the lack of a high-performance cooling system, preferably a cooling jacket assembly with incorporated pin fin arrangement for cooling the stator of a high performance electric machine.

Although this invention has special application to electric machines, the relevant prior art represents a solution according to the patent WO2002103187 (New Power Concepts LLC) in which the heat exchanger of a Stirling engine heater head is disclosed. The solution according to said patent discloses a method of making the heat exchanger and its implementation, with a key shortcoming of the disclosed solution, shown in the fact that the solution according to the patent WO2002103187 discloses the heat exchanger for transferring a thermal energy across the heat engine heater head, where a heat from a heated external fluid is transferred to a working fluid on the inner side of the heat exchanger, hence the heat exchanger comprises a pin fin arrangement on both sides of the base plate. In addition, the sectors of unidirectional oriented heat transfer protuberances (so called pin fins) comprises a plurality of longitudinal dividing structures that prevents the coolant to circulate around a heat exchanger central axis, hence annular fluid flow is not possible. It is important to notice that the heat exchanger is a device (i.e. a component) that keeps two coolants separate but allows a transfer of heat energy between them, wherein the heat sink is a passive heat exchanger that substantially cools a target device by dissipating a heat to the cooling medium (i.e. fluid).

Prior systems for cooling an electric machine by incorporated heat sink have suffered various drawbacks, including expense, difficulty in manufacture and assembly, and other disadvantages. Therefore, there is a need, for a cooling jacket assembly with incorporated pin fin arrangement, which is economical to manufacture, easy to assemble, and capable of effective cooling.

SUMMARY

A heat sink of the present invention is preferably part of a cooling jacket assembly, used for cooling the electric machine assembly. In general, the cooling jacket assembly comprises an annular cooling jacket body (i.e. a heat sink) preferably adapted for receiving a stator of the electric machine, thus the heat sink in preferential embodiment is designed as a stator frame in form of a sleeve for receiving the stator. In addition, the heat sink of a cooling jacket comprises at least one substantially cylindrical (i.e. circular or polygonal cylinder) wall section with at least one group of incorporated unidirectional heat transfer protuberances (i.e. a plurality of protruding segments, hereinafter referred to as a pin fins), wherein the heat sink in cooperation with the electric machine assembly forms an annular gap (i.e. a cooling channel, defined by form of substantially coaxial and parallel inner and outer cylindrical shells), preferably adapted for coolant flow circulation. It can be understood, that a cooling jacket of an electric machine according to the invention is part of a cooling circuit with additional means for a coolant distribution involved (i.e. pump, hoses/pipes, coolant connection ports, etc.), wherein the cooling jacket in a preferential embodiment is connected with connection ports to a coolant re-circulation loop containing an additional heat exchanger for dissipating the heat from the coolant after it exits the cooling jacket.

It is important to notice, that the heat sink with incorporated groups of pin fins is preferably fabricated by casting or metal injection molding in a single operation; hence the unidirectional pin fins in a single group are substantially parallel with the corresponding mold release angle (i.e. a mold side-action direction).

Preferred embodiments of the present invention will now be described with reference to the accompanying drawings.

DETAILED DESCRIPTION

Figure 1:
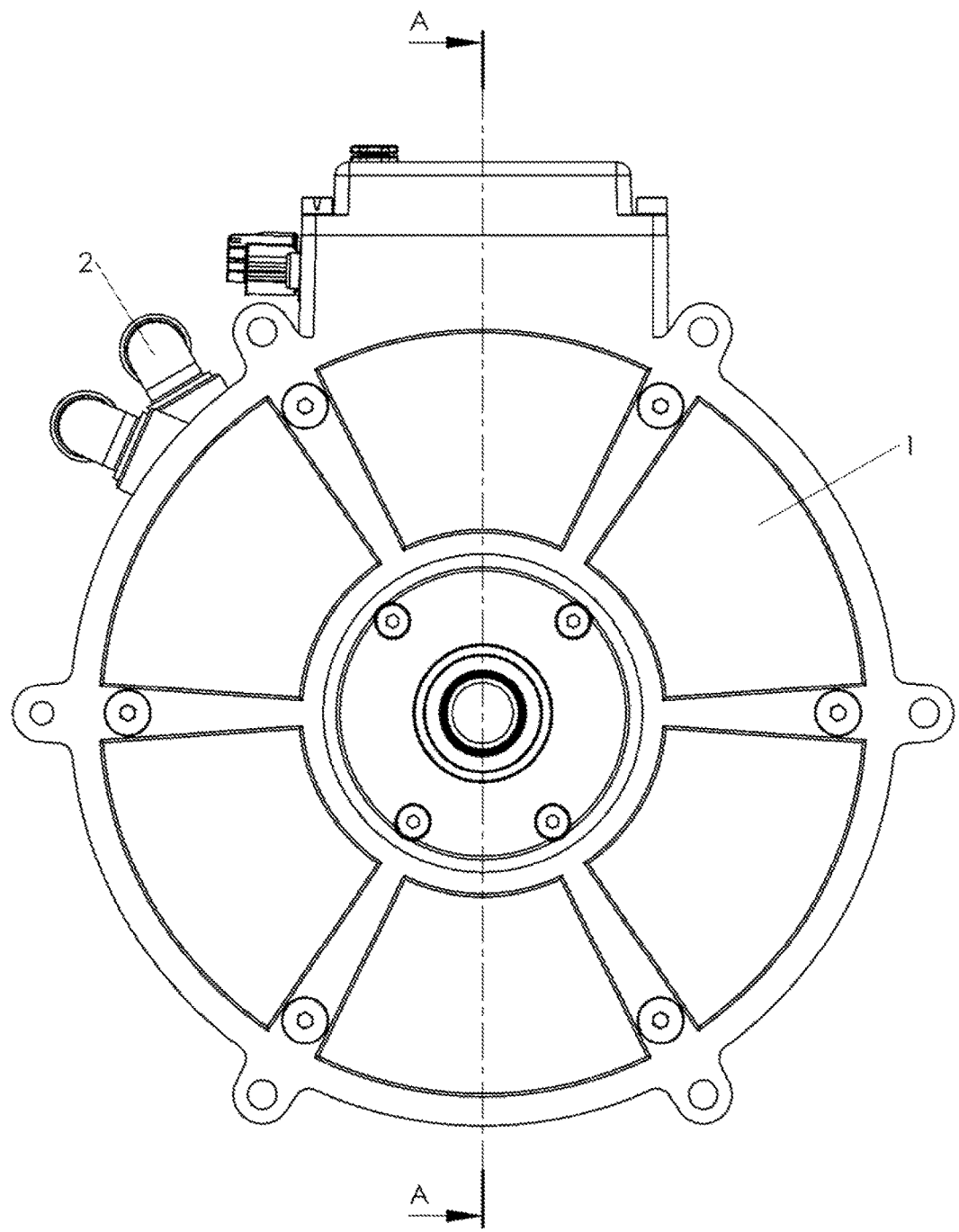
FIG. 1 is a front view of an electric machine with a built-in cooling jacket according to the invention. The following items are shown and marked in the FIG. 1: the housing 1, a coolant connection port 2 and a cross section plane A-A.
Figure 2:
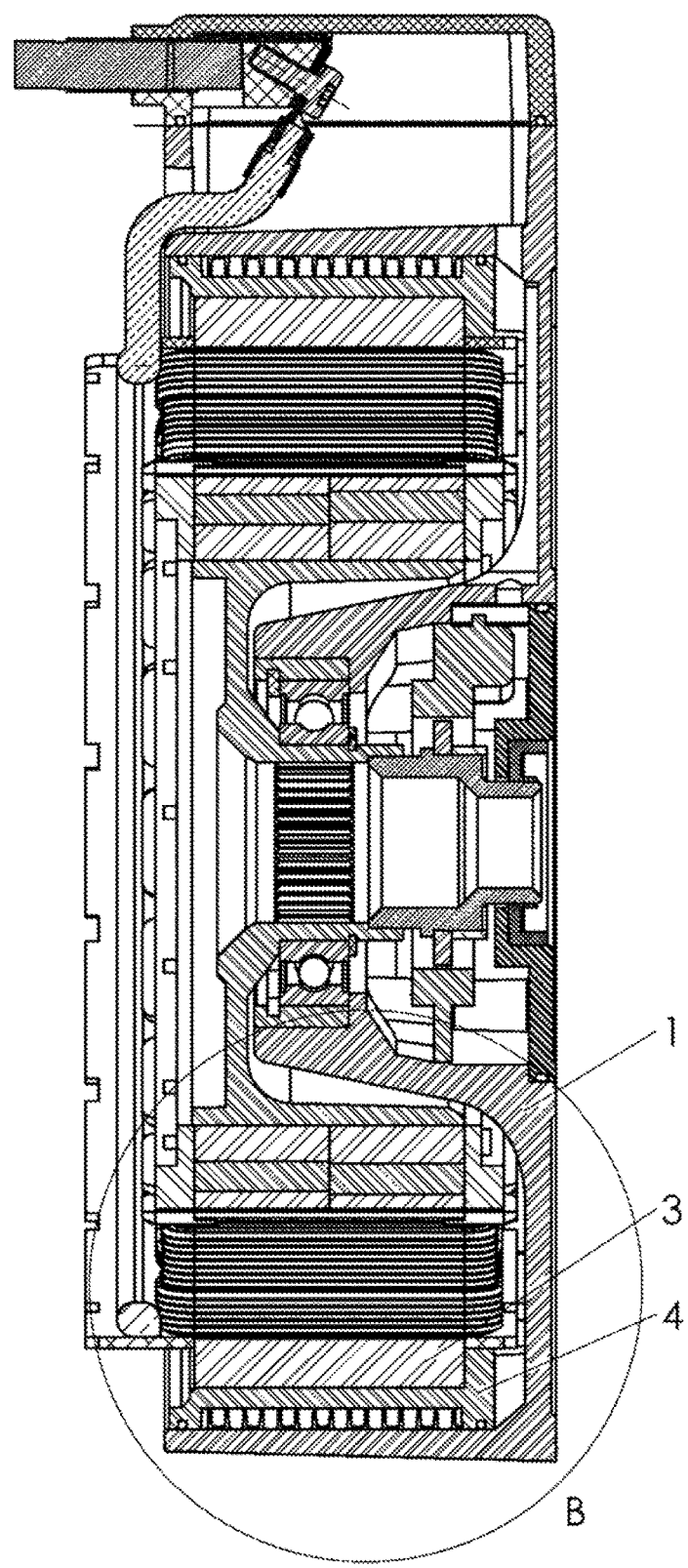
FIG. 2 is a section view of the cross-section plane A-A, as marked in the FIG. 1. The following items are shown and marked in the FIG. 2: the housing 1, a stator 3, a cooling jacket heat sink 4, and the scope of a detailed view B.

In a preferential embodiment the cooling jacket for cooling a stator 3 of an electric machine is designed as an annular heat sink 4, having at least one substantially cylindrical wall section surface (hereinafter referred to as a first surface 41) with at least one group of unidirectional pin fins 42 in free-form formation incorporated therein, where each pin fin 42 has an axis directed substantially away from the first surface 41. It is important to notice, that the heat sink 4 in a preferential embodiment comprises at least one random cross section (i.e. cross section plane C-C), being perpendicular to the first surface 41 central longitudinal axis 48, that preferably comprises at least two sectors 40 with group of pin fins 42, being oriented to the inner side or outer side of the first surface 41 (i.e. in relation to the first surface), where each of pin fins 42 in the single sector 40 has an axis, substantially parallel to the sector form release angle β. In addition, the sector 40 comprises at least two pin fins 42, that forms significantly different angle between the corresponding bisector angle α/2 and individual intersection of the first surface 41 with associated pin fin 42 in relation to the central axis 48 of the first surface 41.

The preferential embodiment of the heat sink 4 is designed as a substantially symmetrical annular body, where the number of sectors 40 is preferably tailored to the number of heat sources (i.e. stator coils). While one of elementary objects of the present invention is to provide a cost effective solution for serial production, the number of sectors 40 is preferably minimized with aim to maintain a feasible solution. Thus, the sector 40 is defined by the sector central angle α, being preferably in the range between 18° and 180°, wherein the sector form release angle β being formed by bisector and the axis of pin fin 42 intersecting the first surface 41 is due to the tooling requirements preferably between +45° and −45° (i.e. clockwise and anticlockwise inclination respectively) in relation to the corresponding bisector angle α/2.

In addition, the position of pin fins 42 in the sector 40 on the first surface 41 is selectively tailored to the heat sources in the scope of the sector 40 with aim to prevent the hot spot areas on the heat sink 4, wherein the sector 40 boundary lines are preferably aligned with symmetry of stator slots interspaces. Furthermore, a pattern of pin fins 42 on the first surface 41 is adapted to the required pressure drop and coolant flow regime (i.e. whether the coolant in the cooling channel flows in a nearly circular, mixed or in nearly longitudinal path) where pin fins 42 may be arranged on the first surface 41 in a free-form formation comprising a staggered, wavy, helical or inline pattern.

Figure 3:
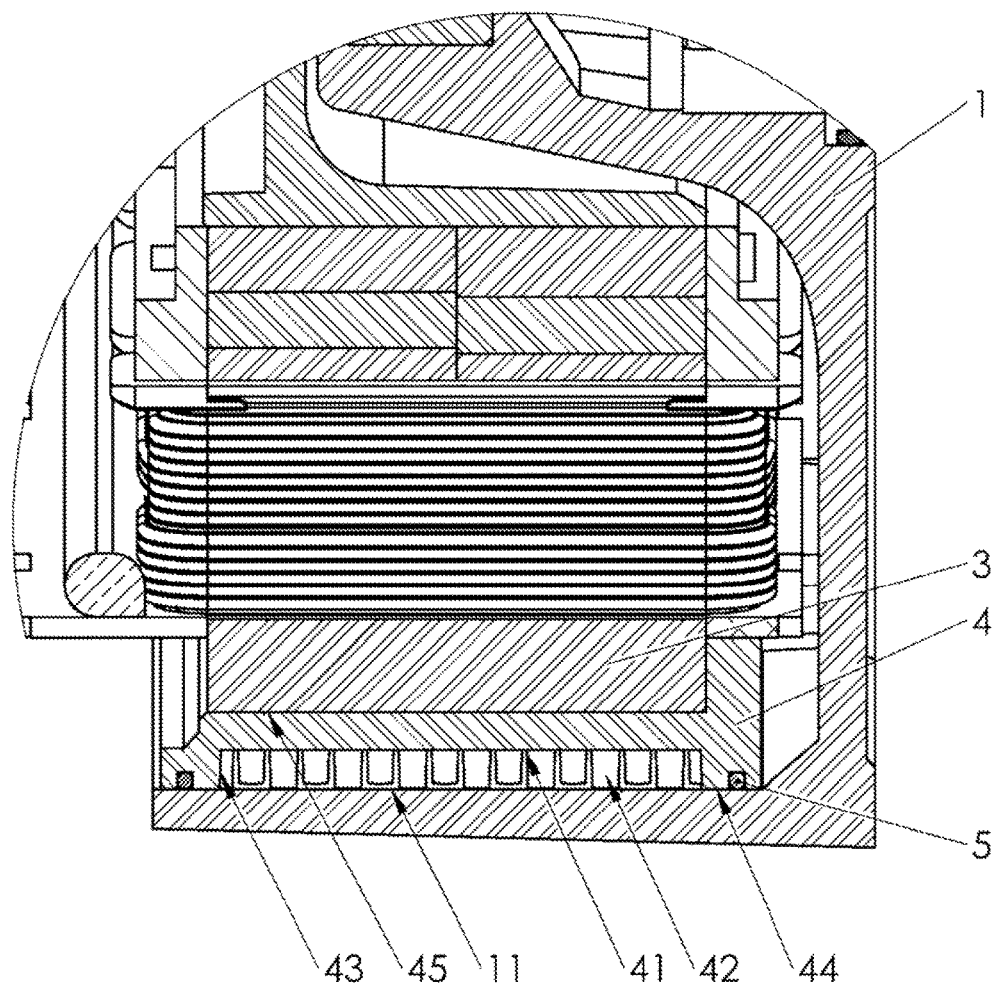
FIG. 3 is a section view of the cross-section plane A-A, as marked in the FIG. 1, here shown in the area of the detailed view B as marked in the FIG. 2. The following items are shown and marked in the FIG. 3: the housing 1 and its target surface 11, the stator 3 of the electric machine, the heat sink 4 with its first surface 41 and one of the protruding pin fins 42, a boundary wall 43, an abutment surface 44, a contact surface 45 and the annular seal 5. It can be understood, that in order to maintain the clarity of the figure, only one of each from plurality of substantially the same elements displayed is actually labeled.
Figure 4:
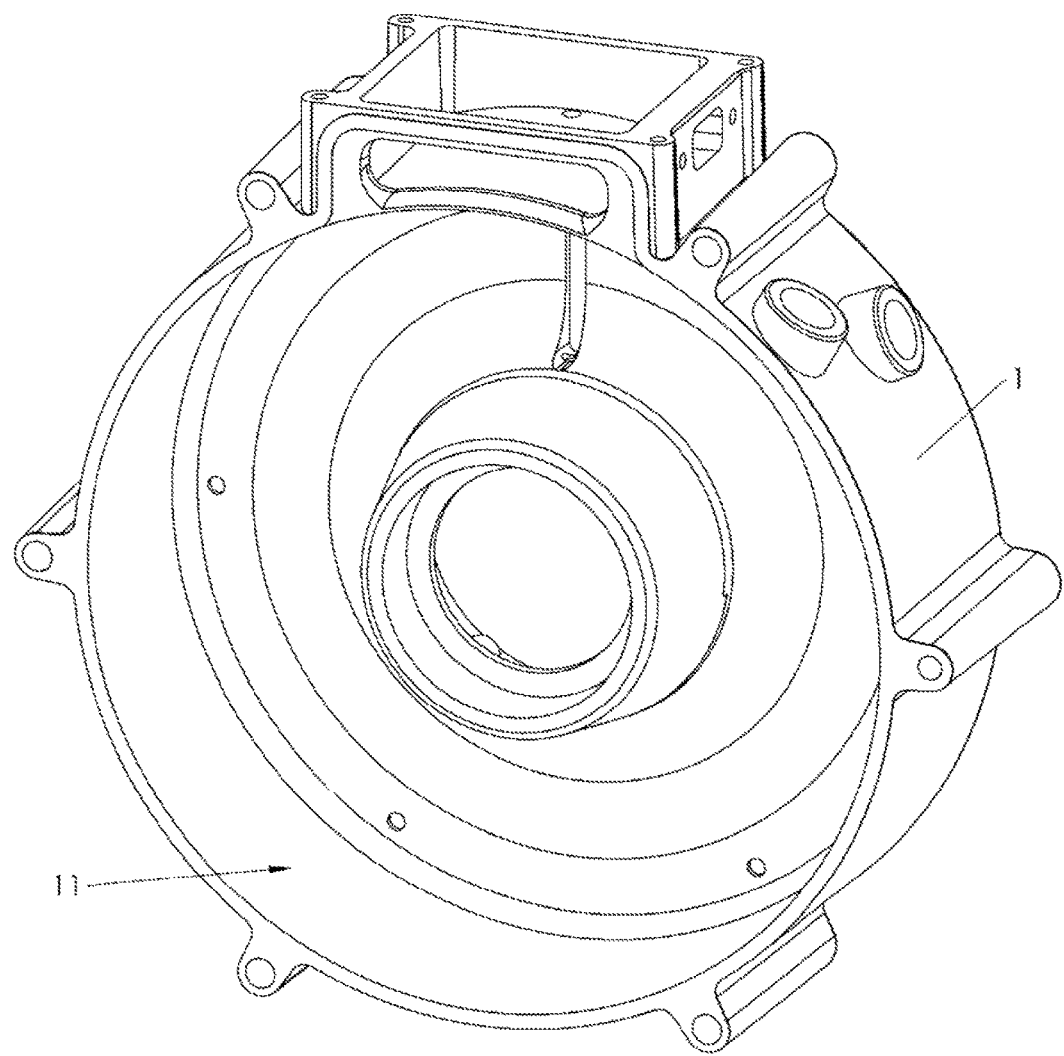
FIG. 4 shows the housing 1 of the electric machine in a dimetric projection, where the housing 1 and its target surface 11 in a function of a cooling jacket outer shell are marked in the FIG. 4.
Figure 5:
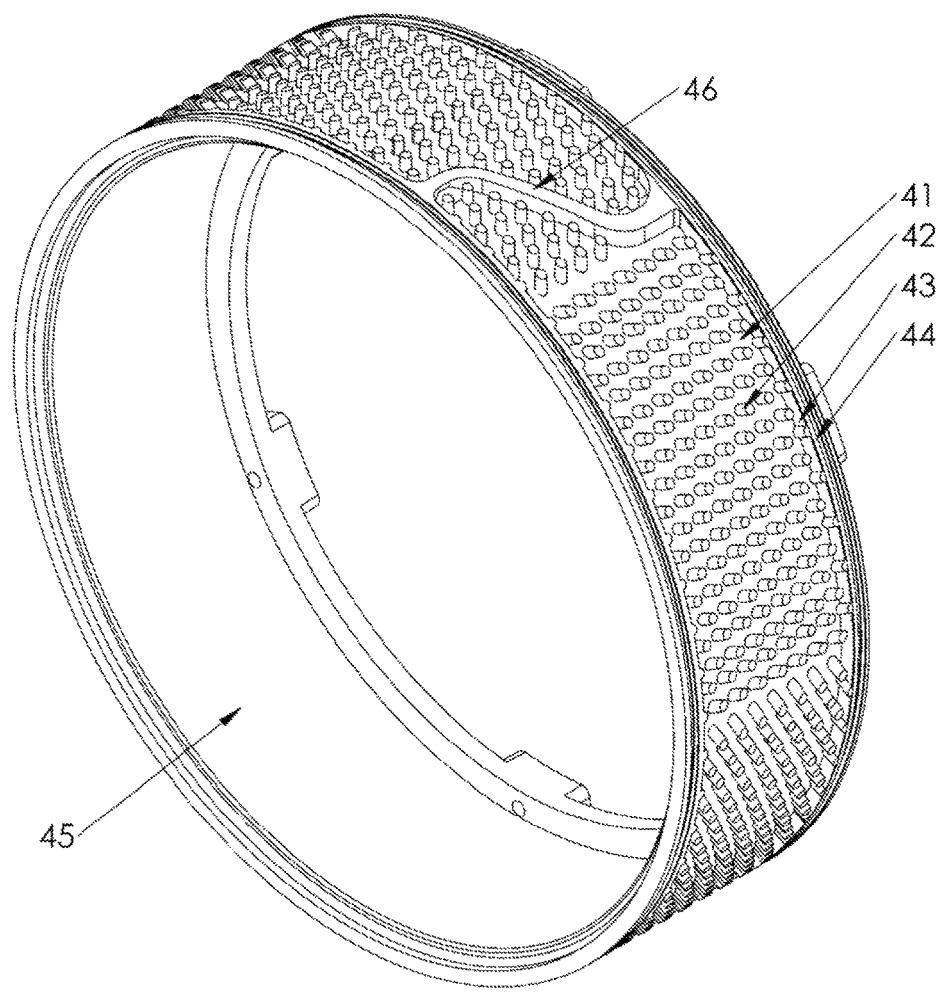
FIG. 5 shows a preferential embodiment of the heat sink 4 in an isometric projection. The following items are shown and marked in the FIG. 5: the first surface 41, the pin fin 42, a boundary wall 43, an abutment surface 44, the contact surface 45, and the barrier 46 in a function of the cooling channel dividing structure.
Figure 6:
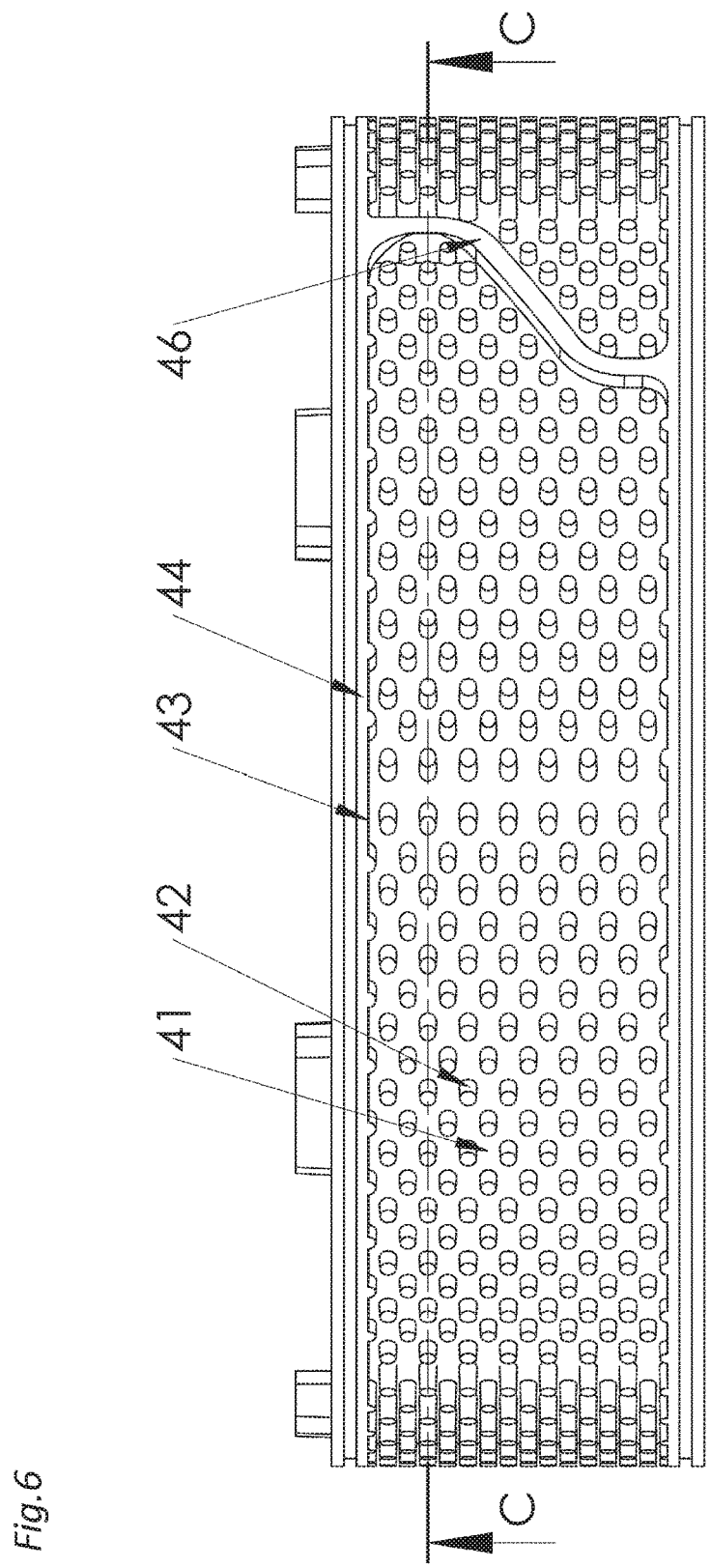
FIG. 6 shows the heat sink 4 in a side view. The following items are shown and marked in the FIG. 6: the first surface 41, the pin fin 42, a boundary wall 43, an abutment surface 44, the barrier 46, and a cross section plane C-C.

The heat sink 4 of a cooling jacket according to the invention is preferably designed as a sleeve, adapted to receive the stator 3 on the contact surface 45, and furthermore adapted for installation into the target surface 11 of the electric machine housing 1, hence a cooling channel of the cooling jacket is substantially formed by the first surface 41 and by the target surface 11 in cooperation of a heat sink 4 and electric machine housing 1. It is important to notice, that pin fins 42 on the first surface 41 are in preferential embodiment directed to the outer side of the first surface 41, hence the watertight connection between first surface 41 and stator 3 stack of lamination sheets is accomplished by the heat sink 4 body; and similarly, the watertight connection between the heat sink 4 and a target body (i.e. preferably the housing 1 with plurality of convenient surfaces) is accomplished by the target surface 11. In order to provide a cooling circuit closed loop connection (i.e. watertight cooling channel between the coaxial inner and outer cylindrical shells of a cooling jacket) the cooling jacket further comprises a boundary walls 43, preferably being a part of the heat sink 4, where annular seals 5 are added on abutment surface 44 for watertight connection between the housing 1 and heat sink 4 of a cooling jacket, as shown best on the FIG. 3.

As follows, pin fin 42 arrangement on the first surface 41 may be selectively at least locally adapted to the goal driven arrangement designs with aim to form a longitudinal or circumferential pattern of pin fins 42 in order to manipulate with the pressure drop within the cooling channel, wherein spacing between pin fins 42 axis is between 0.05 millimeter and 100 millimeters. Such an example of selectively repositioned and goal driven pattern of pin fins 42 is represented by a substantially longitudinal pressure generation barrier 46, which is formed on the first surface 41 by fully concentrated (i.e. merged) pin fin 42 pattern within the single sector 40 with aim to rise the pressure in the local area of inlet/outlet manifold aperture, thus the coolant flow in cooling channel is forced to flow in a nearly circular path according to the annular shape of the heat sinks 4. On the contrary, the goal driven pattern of pin fins 42 is alternatively represented by the group of missed or skipped pin fin 42 instances in the scope of the pin fin 42 arrangement on first surface 41, wherein the circumferential or longitudinal clearance zone 47 (i.e. groove) is formed on first surface 41 with aim to manipulate the pressure in the cooling channel as well. It can be understood, that the goal driven pin fin 42 arrangement designs shall comprise partially or completely merged, and alternatively partially or completely eliminated pin fin 42 instances to accomplish the required coolant flow regime in the cooling channel.

Referring to the preferential embodiment as shown on FIGS. 1-7, the heat sink 4 of a cooling jacket assembly is adapted to receive (i.e. to collide with) the housing 1 and stator 3 of electric machine. As best shown on the FIGS. 5, 6 and 7, pin fins 42 on the first surface 41 are arranged in the goal driven pattern, thus adapted to form the substantially longitudinal barrier 46, which preferably interconnects a boundary walls 43 of the cooling jacket while forming the inlet/outlet manifold aperture, hence the flow of the coolant in a cooling channel is forced to flow in a nearly circular path between inlet and outlet aperture. Furthermore, as best shown on FIGS. 3 and 5, the pattern of a staggered pin fin 42 arrangement starts and ends on a boundary wall 43 of the cooling channel, thus the coolant bypass flow is prevented due to the boundary wall 43 with incorporated pin fin 42 arrangement.

Figure 7:
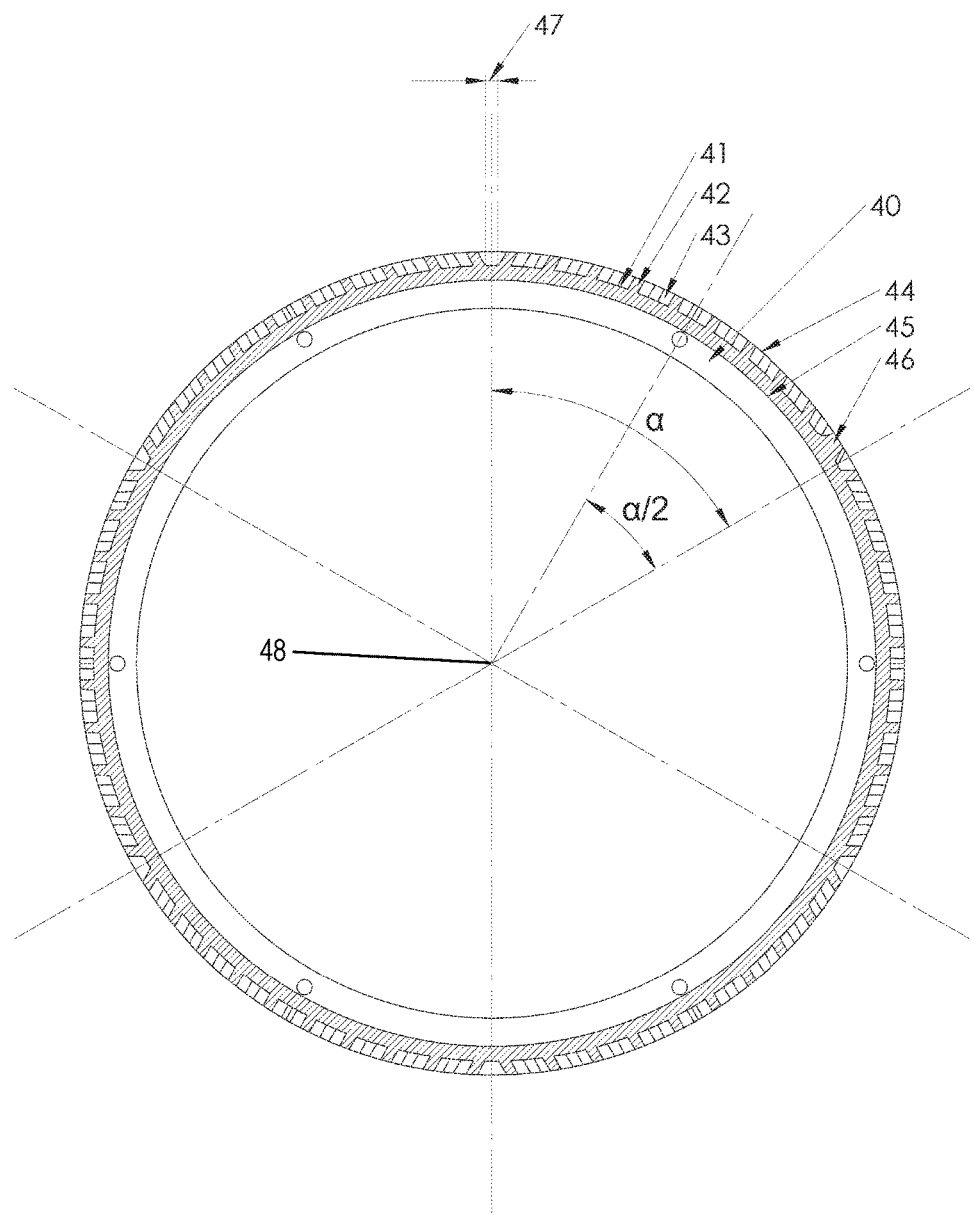
FIG. 7 shows the heat sink 4 in the cross section plane C-C. The following items are shown and marked in the FIG. 7: a randomly selected sector 40 of the heat sink 4, the first surface 41, the pin fin 42, a boundary wall 43, an abutment surface 44, the contact surface 45, the barrier 46, a clearance zone 47, a sector central angle α, and a corresponding bisector angle α/2.

As best shown on FIG. 7, pin fins 42 in shown embodiment are substantially directed to the outer side of the first surface 41, wherein pin fins 42 are grouped in plurality of sectors 40. It is important to notice, that the axis of the each pin fin 42 in the single sector 40 is substantially parallel to the sector form release angle β, wherein the sector form release angle β value is in the range between the ±value of the bisector angle α/2 (i.e. a range between the positive and negative value of the bisector angle α/2) in relation to the bisector angle α/2, although a symmetry of sectors 40 is not obligatory. To concretize, according to the embodiment shown on the FIG. 7, sectors 40 are spread in a symmetrical pattern around first surface 41 central axis with spacing in the value of the sector central angle α, here being equal to 60° (i.e. 360° divided by 6 symmetrical sectors 40, while adapted to the position of 18 coils on the stator 3—coils not shown on figures), thus a value of the bisector angle α/2 is equal to 30°, hence the range of the sector form release angle β is in the range of ±30°, thus the sector form release angle β as shown on FIG. 7 is equal to 0° (i.e. the sector form release angle β is parallel to the bisector angle α/2).

Figure 8:
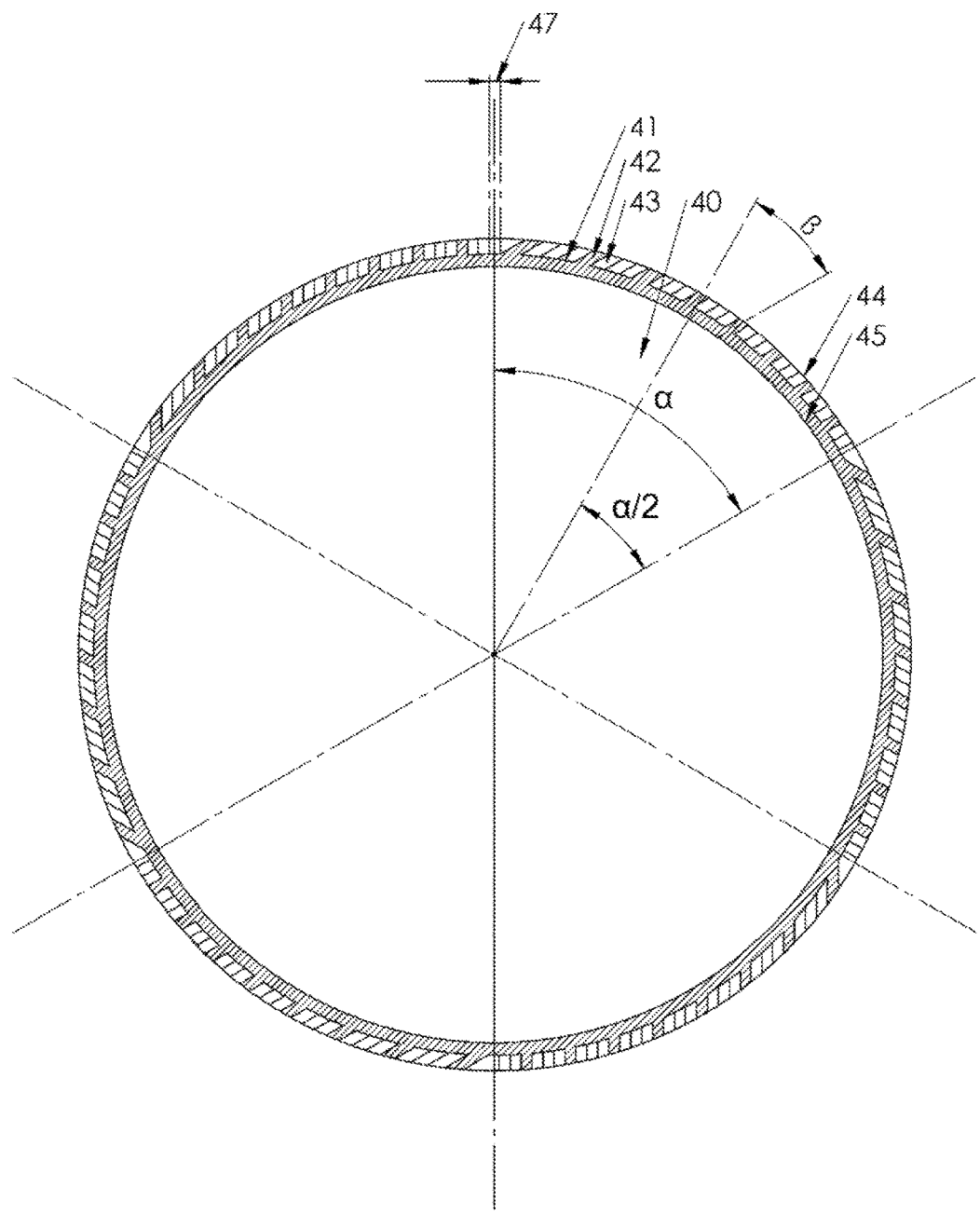
FIG. 8 shows the second embodiment of the heat sink 4 in a random cross section, being perpendicular to first surface 41 central longitudinal axis. The following items are shown and marked in the FIG. 8: a randomly selected sector 40 of the heat sink 4, the first surface 41, the pin fin 42, a boundary wall 43, an abutment surface 44, a contact surface 45, the clearance zone 47, the sector central angle a with its corresponding bisector angle α/2, and a sector form release angle β.

In another embodiment, as shown on FIG. 8, pin fins 42 on the first surface 41 are still directed to the outer side of the first surface 41, and moreover the sector form release angle β of shown exemplary embodiment is here still in the range of ±value of the bisector angle α/2, however the sector form release angle β of depicted embodiment is here equal to −30° (i.e. inclination of pin fins 42 axis in the clockwise direction). Furthermore, it is important to notice, that depicted exemplary embodiment shown on FIG. 8 does not comprise a longitudinal barrier 46 to force the coolant flow in a circular path between inlet and outlet aperture. Hence, pin fin 42 arrangement on the first surface 41 forms a circumferential groove (i.e. the circumferential clearance zone 47, formed by group of a missed pin fin 42 instances in the area of inlet and/or outlet aperture), where the coolant is redistributed in the circumferential groove, which acts as a pressure redistribution chamber, preferably formed by and situated between the boundary wall 43 and first/last row of pin fin 42 arrangement on the first surface 41 in the area of inlet/outlet aperture. Furthermore, if appropriate, the first and last row of pin fin 42 arrangement on the first surface 41 is adapted (i.e. preferably by partly concentrated pattern) to equalize the pressure drop in a circumferential groove with aim to accomplish the effect of a pressure redistribution chamber in order to provide a mixed (i.e. complex) coolant flow regime in a cooling channel. It is important to notice, that similar effect of the pressure redistribution chamber can be achieved by incorporating the annular groove into the target surface 11 of the electric machine housing 1, although this solution is generally less feasible due to the electric machine length and/or diameter limitation.

In addition to represented embodiment, an advanced cooling jacket is adapted to a mixed coolant flow regime, wherein the coolant firstly enters in the cooling channel through the inlet aperture. While the first surface 41 of an advanced cooling jacket heat sink 4 comprises a circumferential groove (i.e. inlet manifold, formed by circumferential clearance zone 47 in the scope of pin fin 42 arrangement) in the area of inlet aperture, the coolant is due to the pressure drop difference redistributed in a nearly circumferential path within the inlet manifold, generated by missed pin fin 42 arrangement on the first surface 41. When the pressure in the inlet manifold is increased and at least partially equalized, the coolant flow is secondly redirected and enforced to travel axially, in a near longitudinal direction through the pin fin 42 arrangement on the first surface 41. Furthermore, while the first surface 41 further comprises a similar circumferential groove in the area of the outlet aperture as well (i.e. outlet collector, formed by circumferential clearance zone 47 in the pin fin 42 arrangement), the coolant flow is collected within the outlet collector and again redirected in a nearly circumferential path, and forced towards to the outlet aperture, wherein the cooling channel is preferably connected to the re-circulation loop with the inlet/outlet coolant connection ports 2.

Figure 9:
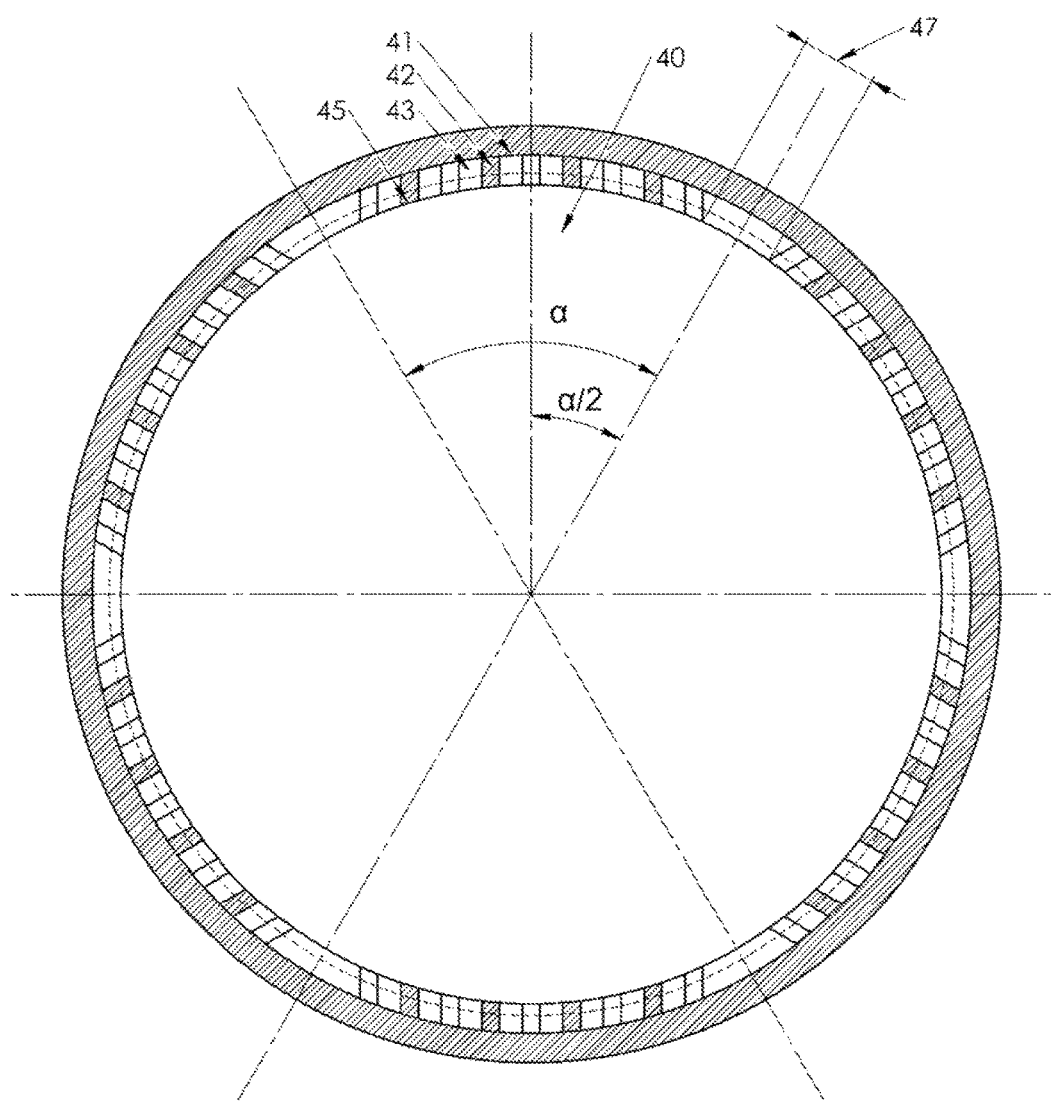
FIG. 9 shows the third embodiment of the heat sink 4 in a random cross section, being perpendicular to first surface 41 central longitudinal axis. The following items are shown and marked in the FIG. 9: a randomly selected sector 40 of the heat sink 4, the first surface 41, the pin fin 42, a boundary wall 43, a contact surface 45, the clearance zone 47, the sector central angle α, and the corresponding bisector angle α/2.

In yet another embodiment, as shown on FIG. 9, the pin fins 42 are still grouped in sectors 40 and directed away from the first surface 41, however the pin fins 42 in a depicted exemplary embodiment are here directed (i.e. oriented) to the inner side of the first surface 41, hence the contact surface 45 is herein substantially represented by tips of pin fins 42 and abutment surface 44. As follows, the cooling channel of the cooling jacket may be formed by the heat sinks 4 first surface 41 and by stack of the stator 3 lamination sheets, being in convenient watertight connection (i.e. sheets of stator lamination being bonded with epoxy resin), wherein at least contact surface 45 may further comprise a thermal interface material (i.e. epoxy resin, gel, paste, grease, glue etc.) to enhance the heat transfer from stator 3 to the heat sink 4. Alternatively, the watertight connection for cooling channel is provided by substantially outer surface of electric machine housing 1 or by additional tube (i.e. additional sleeve in the scope of electric machine assembly), adapted to receive the stator 3 stack of lamination sheets on inner side, and similarly, to receive the heat sink 4 contact surface 45 on the outer side of the sleeve. In addition, similar to previous embodiment shown in FIG. 8, the heat sink 4 in FIG. 9 is designed for a mixed coolant flow as well, wherein the cooling channel comprises at least one pressure redistribution chamber, formed by the circumferential clearance zone 47 with pattern of missed pin fin 42 instances on the first surface 41. Furthermore, it is important to notice, that the first surface 41 of the heat sink 4 comprises wider (i.e. larger) areas of the longitudinal clearance zones 47 due to the tooling requirements of a preferred manufacturing process (i.e. casting). Hence, the heat sink 4 in shown embodiment comprises only one boundary wall 43, while additional tooling segments (i.e. core-pin inserts) are required to form and fabricate the first surface 41 transitions in the area of clearance zones 47, between neighbored sectors 40 of the heat sink 4. As follows, the cooling channel of represented embodiment is preferably formed by a heat sink 4 body with single boundary wall 43 and annular seal 5 included, wherein the opposite (i.e. missing) cooling channel boundary is formed by the housing 1 or another heat sink 4 body, where a watertight/thermal connection between parts of cooling jacket assembly shall be accomplished by additional bond, seal, glue, adhesive material (i.e. epoxy resin), shrink-fit connection or technological process, such as brazing or friction stir welding for example. Hence, the heat sink 4 is applicable for simple or complex cooling system designs by bonding at least two heat sinks 4 into the complex structure with aim to provide the advanced cooling jacket assembly.

In the foregoing description and accompanying drawings, pin fins 42 are generally represented as substantially cylindrical heat transfer protuberances, where each of the pin fins 42 comprises substantially circular cross section. It can be understood, that pin fin 42 shape contour is not limited to herein depicted circular shape, on the contrary, the cross section contour of individual pin fin 42 may be in the shape of a semicircle, ellipse, crescent, raindrop, triangle, rectangle or polygon, whereby the design of the pin fin 42 in preferential embodiment is adapted to the requirements of the technological process (i.e. casting or molding). It can be understood, that outer surface of the individual pin fin 42 comprises a draft angle in relation to its axis, to form the pin fin 42 of tapered formation with broadest end of the pin fin 42 next to the first surface 41, wherein the inclination of the pin fin 42 axis in relation to the first surface 41 has a major impact on coolant flow regime (i.e. Coanda effect utilization). In a preferred embodiment, the diameter of the circumscribed circle to the pin fin 42 cross section is in the range of 0.25 millimeter to 100 millimeters, and similarly the height of individual pin fin 42 along its central axis between broadest and narrowest cross section is in preferential embodiment in the range of 1 millimeter and 100 millimeters. Furthermore, the diameter of a circumscribed circle to substantially circular first surface 41 is in the range of 20 millimeters and 1500 millimeters, wherein the first surface 41 texture shall be smooth-annular, wavy-annular, serrated-annular or dimpled with aim to enhance the turbulent flow generation, while a heat sink 4 represents an extended surface over which a fluid (i.e. preferably water, mix of water and glycol, or air) flows.

The preferential method for manufacturing the heat sink 4 of a cooling jacket assembly may include steps of fabricating a plurality of negative molds to form a complex mold assembly with multiple slides for heat sink 4 manufacturing process utilization, wherein each of the side-action molds at least partially correspond to the associated sector 40 geometry of the heat sink 4. More precisely, at least one side mold, being part of the complex mold assembly with aim to fabricate a heat sink 4, comprises a group of substantially parallel holes and cavities corresponding to pin fins 42 and details of the associated sector 40 on the heat sink 4, where the plurality of negative molds is assembled to form a negative form for casting or molding the heat sink 4 according to the invention. In addition, the heat sink 4 is preferably fabricated as almost finished product by metal injection molding, investment casting, and sand or die casting, where a fabricated part is released from assembled mold by pulling the plurality of negative side-action molds apart, more precisely in direction of associated sector form release angle β. It can be understood, that casted heat sink 4 normally still require some minor machining of contact surface 45, abutment surface 44, seal 5 grooves, inlet/outlet apertures, venting holes etc., to finish the part made of aluminium or magnesium alloy with tolerances and surface finish, required for proper assembling of the heat sink 4 and electric machine.

In the foregoing description those skilled in the art will readily appreciate that modifications may be made to the invention without departing from the scope of the invention. Such modifications are to be considered as included in the following claims, unless these claims expressly state otherwise.

I claim:

1. A heat sink for cooling at least one heat dissipating surface of an electric machine assembly, said electric machine assembly comprising a stator and a housing with plurality of surfaces; said heat sink comprising;
   at least one wall with at least one surface area exposed to a cooling medium, wherein said wall is at least partially structured to interact with at least one portion of said electric machine assembly; said wall further comprising a central longitudinal axis and at least one first surface in communication with said cooling medium;
   said first surface further comprising at least one arrangement of pin fins, wherein said pin fins extend from said first surface, and wherein said pin fins protrude away from said first surface;
   said first surface further comprises at least one cross section plane, wherein said cross section plane is perpendicular to said central longitudinal axis; said cross section plane further comprising at least one sector; said sector further comprising a sector central angle, a bisector angle, and a sector form release angle, wherein said sector central angle is in the range between 18° and 180°, and wherein said sector form release angle is defined by the bisector angle and the axis of the pin fin intersecting the first surface and is in a range between +45° and −45° in clockwise and anticlockwise inclination respectively; wherein said sector further includes a group of pin fins of the at least one arrangement of pin fins on said first surface, wherein said pin fins are aligned with said sector form release angle, and wherein at least two pin fins from said group of pin fins in the sector intersect the first surface at different positions along a circumference of the first surface,
   wherein the arrangement and inclination of said group of pin fins in relation to said first surface is according to said sector release angle adjusted to the required cooling medium flow regime.

2. The heat sink according to claim 1, wherein at least one pin fin of said group of pin fins comprises a central axis of said pin fin and at least one cross section of said pin fin, wherein said pin fin cross section is perpendicular to said pin fin central axis; and wherein said pin fin cross section further comprises a shape having a diameter in the range between 0.25 millimeter and 100 millimeters, wherein the diameter varies along said pin fin central axis, wherein said pin fin has a tapered formation comprising a broadest end of the pin fin proximal to the first surface; and wherein the minimum distance between said broadest and narrowest cross section along said pin fin central axis is between 1 millimeter and 100 millimeters.

3. The heat sink according to claim 2, wherein said group of pin fins on said first surface are arranged on an outer side of said first surface.

4. The heat sink according to claim 3, further comprising a cooling channel in communication with said cooling medium.

5. The heat sink according to claim 2, wherein said group of pin fins on said first surface are arranged on an inner side of said first surface.

6. The heat sink according to claim 5, further comprising a cooling channel in communication with said cooling medium.

7. The heat sink according to claim 6, wherein said first surface includes a plurality of said sectors.

8. The heat sink according to claim 7, wherein each pin fin of the group of pin fins has a pin fin axis, and wherein a spacing between the pin fin axes of at least two pin fins of the group of pin fins is between 0.05 millimeters and 100 millimeters.

9. The heat sink according to claim 8, wherein said cooling channel further includes at least two boundary walls, wherein said at least two boundary walls interconnects at least two of said coaxial and at least partially parallel inner and outer cylindrical shells of said cooling channel.

10. The heat sink according to claim 9, wherein said first surface comprises at least one boundary wall of the at least two boundary walls.

11. The heat sink according to claim 10, wherein said at least one boundary wall of said cooling channel further includes an annular seal, wherein the cooling channel is in fluidtight connection with said heat sink and said electric machine assembly, and said cooling channel is further in communication with said cooling medium, wherein said cooling medium is air, water or mix of water and glycol; and
   wherein said cooling channel further includes at least two coolant connection ports, wherein said at least two connection ports are configured to interact with said inlet aperture and said outlet aperture of said cooling channel.

12. The heat sink according to claim 1, wherein said first surface includes a plurality of said sectors.

13. The heat sink according to claim 1, wherein each pin fin of the group of pin fins has a pin fin axis, and wherein a spacing between the pin fin axes of at least two pin fins of the group of pin fins is between 0.05 millimeters and 100 millimeters.

14. The heat sink according to claim 13, wherein said cooling channel further includes at least two boundary walls.

15. The heat sink according to claim 14, wherein said first surface comprises at least one boundary wall of the at least two boundary walls.

16. The heat sink according to claim 15, wherein said at least one boundary wall of said cooling channel further includes an annular seal, wherein the cooling channel is in fluidtight connection with said heat sink and said electric machine assembly, and said cooling channel is further in communication with said cooling medium, wherein said cooling medium is air, water or mix of water and glycol; and
   wherein said cooling channel further includes at least two coolant connection ports, wherein said at least two connection ports are configured to interact with said inlet aperture and said outlet aperture of said cooling channel; and wherein said pin fins of said first surface in free-form formation are arranged in a pattern configured to facilitate utilization of a pressure redistribution chamber and of a pressure generation barrier.

17. The heat sink according to claim 16, said pressure redistribution chamber in said cooling channel is defined by said goal driven pattern of pin fins on said first surface, wherein said first surface further includes at least one local area of a longitudinal or circumferential clearance zone without pin fins;
   wherein said pressure generation barrier includes a longitudinal goal driven pattern of pin fins situated between said at least two boundary walls in area of at least one of said inlet aperture and said outlet aperture of said cooling channel, wherein said pressure generation barrier further includes a plurality of merged pin fins on said first surface (41); and
   wherein said wall is composed of aluminium or magnesium alloy and further includes at least one contact surface, wherein said contact surface comprises a thermal interface material, wherein said thermal interface material comprises a resin, glue, gel, paste or grease.

18. The heat sink according to claim 14, wherein at least one of said at least two boundary walls of said cooling channel is part of said housing of said electric machine assembly.

19. A method of manufacturing a heat sink for cooling at least one heat dissipating surface of an electric machine assembly, said electric machine assembly including a stator and a housing with a plurality of surfaces, comprising;
   fabricating at least one wall with at least one surface area configured to be exposed to a cooling medium, wherein said wall is at least partially structure to interact with at least one portion of said electric machine assembly, said wall further including a central longitudinal axis and at least one first surface configured to communicate with said cooling medium;
   wherein fabricating said wall includes at least one manufacturing process selected from the group consisting of a metal injection molding process, a die casting process, an investment casting process or a sand casting process, and said first surface further comprising at least one cross section plane perpendicular to said central longitudinal axis, said cross section plane comprising a sector; and furthermore,
   forming at least one group of pin fins on said first surface in said sector, said sector comprising a sector central angle, a bisector angle, and a sector form release angle, wherein said sector central angle is in a range of between 18° and 180°, and said sector form release angle is defined by the bisector angle and an axis of the pin fin intersecting the first surface and ranges between +45° and −45° in clockwise and anticlockwise inclination, respectively, wherein said pin fins are aligned with said sector form release angle and protrude away from said first surface, wherein the arrangement and inclination of said pin fins in relation to said first surface is according to said sector release angle adjusted to the required cooling medium flow regime, and wherein said heat sink is fabricated in a single operation.

* * * * *